United States Patent [19]

Takeuchi et al.

[11] Patent Number: 4,762,079
[45] Date of Patent: Aug. 9, 1988

[54] TRIM TAB ACTUATOR FOR MARINE PROPULSION DEVICE

[75] Inventors: Toshio Takeuchi; Shinya Atsumi, both of Hamamatsu, Japan

[73] Assignee: Shansin Kogyo Kabushiki Kaisha, Hamamatsu, Japan

[21] Appl. No.: 33,403

[22] Filed: Apr. 1, 1987

[30] Foreign Application Priority Data

Apr. 1, 1986 [JP] Japan .................... 61-72590

[51] Int. Cl.⁴ ............................................. B63H 25/00
[52] U.S. Cl. ....................................... 114/152; 440/1; 440/51; 114/285
[58] Field of Search ............... 440/51, 53, 57–63, 440/1; 114/144 R, 144 E, 152, 165, 275–277, 281; 244/76 A, 82, 226; 74/480 B

[56] References Cited

U.S. PATENT DOCUMENTS

| | | | |
|---|---|---|---|
| 4,318,699 | 3/1982 | Wendstadt et al. | 114/277 |
| 4,509,924 | 4/1985 | Hall | 440/63 |
| 4,615,290 | 10/1986 | Hall | 440/51 |

FOREIGN PATENT DOCUMENTS 56-160297 12/1981 Japan .

Primary Examiner—Sherman D. Basinger
Assistant Examiner—Jesûs D. Sotelo
Attorney, Agent, or Firm—Ernest A. Beutler

[57] ABSTRACT

A trim tab actuator for a marine propulsion device wherein a plurality of watercraft running conditions are sensed and a trim tab is automatically positioned so as to maintain the watercraft in its preset course as dictated by the measured preset condition.

15 Claims, 2 Drawing Sheets

TRIM TAB ACTUATOR FOR MARINE PROPULSION DEVICE

BACKGROUND OF THE INVENTION

This invention relates to a trim tab actuator for a marine propulsion device and more particularly to an automatically activated trim tab device for maintaining a watercraft on its course.

As is well known, the propulsion device of a watercraft can, at times, generate a force on the watercraft which tends to cause it to deviate from its steered course. For example, in watercraft that are propelled by a propeller and particularly those using an outboard drive such as the outboard drive unit of an inboard-outboard drive or an outboard motor per se, the thrust of the propeller tends to cause the watercraft to turn. For example, if the propeller is rotating in a clockwise direction as viewed from the rear, the boat tends to veer to the left from its steered course. The faster the propeller rotates, the greater the force tending to cause such deviation. In order to avoid such course deviations, it has been the practice to provide some form of trim tab on the outboard drive unit across which the water will flow and which will tend to resist the turning force of the propeller. Obviously, a fixed trim tab will not provide the desired course stability under all running conditions of the watercraft.

It has also been proposed to employ trim tabs that are pivotal relative to the outboard drive and which tend to create hydrodynamic forces on the outboard drive. One such type of trim tab is employed to assist in the steering of the outboard drive. Of course, such arrangements are not advantageous in maintaining the watercraft in a steered course but only assist in course changes. Alternatively, there have been proposed mechanically actuated trim tabs which are intended to keep the watercraft on a steered course. However, when the trim tab is pivoted by a mechanical mechanism that is responsive only to a predetermined mechanically sensed condition, the desired results cannot be obtained satisfactorily.

It is, therefore, a principal object of this invention to provide an improved trim tab actuating device for a marine propulsion unit.

It is a further object of this invention to provide an automatically activated trim tab that will keep a watercraft on its course and regardless of the running conditions encountered.

It is a further object of this invention to provide an automatically operated trim tab that will keep a watercraft on its course in response to any of a variety of sensed varying running conditions.

SUMMARY OF THE INVENTION

This invention is adapted to be embodied in a marine outboard drive comprising propulsion means which is effective to generate a force tending to cause the associated watercraft to deviate from a preset course. Trim tab means are journaled upon the outboard drive and are pivotal to positions for generating a hydrodynamic force upon movement of the watercraft for resisting course deviations caused by the course altering forces generated by the propulsion means. In accordance with the invention, means are provided for measuring a watercraft running condition which condition tends to affect the course deviations. Memory means store information as to the desired trim tab position for the measured watercraft running condition to maintain course. Means are provided for steering the trim tab into the desired position for the measured running condition.

DETAILED DESCRIPTION OF THE PREFERRED EMBODIMENT

Figure 1:
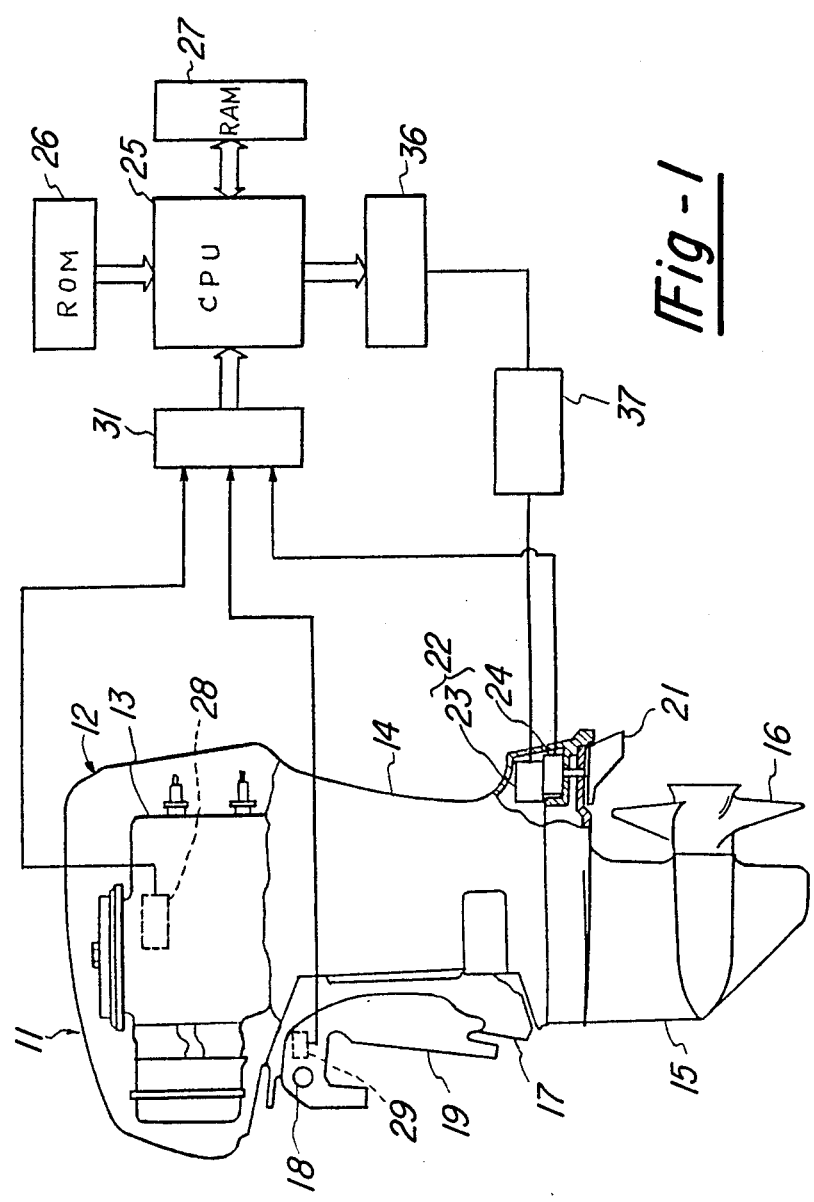
FIG. 1 is a side elevational view, with portions broken away and other portions shown schematically, of a marine propulsion device embodying a trim tab actuator constructed in accordance with an embodiment of the invention.

Referring first to FIG. 1, an outboard motor constructed in accordance with an embodiment of the invention is identified generally by the reference numeral 11. Although the invention is described in conjunction with an outboard motor, it is to be understood that it may be employed with any form of outboard drive or, for that matter, certain facets of the invention can be employed with watercraft powered by other than outboard drives. However, the invention has particular utility in the type of propulsion unit for a marine watercraft wherein the propulsion unit is steerably carried by the watercraft for effecting its steering. Also, the invention has particular utility in propulsion devices wherein the operation of the propulsion device itself tends to create forces on the watercraft which cause it to deviate from its normal course.

The outboard motor 11 includes a power head assembly, indicated generally by the reference numeral 12, and including an internal combustion engine 13, which may be of any known type. The engine 13 drives a drive shaft (not shown) that is journalled within a drive shaft housing 14 that depends from the power head 12. The drive shaft terminates within a lower unit 15 that is positioned at the lower end of the drive shaft housing 14 and drives a propulsion device in the form of a propeller 16 through a suitable forward, neutral, reverse transmission (not shown) which may be of any known type.

In accordance with standard outboard motor practice, the drive shaft housing 14 has affixed to it a steering shaft (not shown) that is journalled for steering movement about a generally vertically extending axis within a swivel bracket 17. The swivel bracket 17 is, in turn, pivotally connected by means of a pivot pin 18 to a clamping bracket 19. The pivotal connection afforded by the pivot pin 18 permits the outboard motor 11 to be tiled up or swung through a plurality of trim adjusted positions, as is well known in this art. The clamping bracket 19 affords an arrangement for detachably connecting the outboard motor 11 to the transom of an associated watercraft. The construction of the outboard motor 11 as thus far described and its connection to the watercraft may be considered to be conventional. For that reason, further details of this construction are not believed to be necessary to understand and practice the invention.

As is well known, the rotation of the propeller 16 in addition to providing the propulsion force for the associated watercraft, generates forces which tend to cause the watercraft to deviate from its normal steered course. For example, if the propeller 16 rotates in a clockwise direction as viewed from the rear, the associated watercraft is likely to veer to the left from its set course. The amount of such veering will be determined by a variety of factors such as the speed, the actual steered position of the outboard motor 11 and the trim angle.

In accordance with the invention, a trim tab, indicated generally by the reference numeral 21, is pivotally supported about an axis that extends parallel to the steering axis by means of the drive shaft housing 14 and in proximity to the lower unit 15 and propeller 16. The trim tab 21 is disposed so that it will be submerged in the water and will generate a hydrodynamic force for compensating for the steering forces generated by the operation of the propulsion unit (propeller 16).

In accordance with the invention, an actuator device, indicated generally by the reference numeral 22 and including a reversible electric motor 23 and gear reduction unit 24, is coupled to the trim tab 21 for rotating it. The reversible electric motor 23 is controlled by means of a control system, to be described, so as to compensate for these turning forces generated by the operation of the propeller 16 and other factors so as to hold the watercraft associated with the outboard motor 11 on its steered course.

As has been noted, the optimum positioning of the trim tab 21 varies with a variety of variable factors associated with the operation of the outboard motor 11 and the watercraft. Among these factors are speed of travel, steering position, trim angle, and a number of other factors. The sensed running conditions are, in accordance with the invention, sensed by any of a plurality of sensors and this information is fed to a central processing unit (CPU) indicated schematically at 25 which CPU also includes a ROM 26 and a RAM 27 and processes these signals and compares with preset values and then control the actuating device 22 so as to set the trim tab 21 in the appropriate position to maintain course for the watercraft conditions.

Realizing the invention, it is believed to be within the scope of those skilled in the art to determine which of these factors will be employed to achieve the control of the trim tab 21 and how, in fact, they are sensed. It should be understood that with certain watercraft, certain of these factors may be insignificant and others more important. In the illustrated embodiment, watercraft speed is sensed by an engine speed sensor, indicated generally at 28, which may comprise the pulser coil of the ignition coil of the engine 13. This engine speed sensor outputs an engine speed signal N to an input interface 31 which converts the signal into an appropriate signal for processing by the CPU 25. Alternatively to sensing engine speed, the watercraft speed may be sensed in any of a variety of fashions, such as by utilizing an actual water speed sensor (ideally a velocity sensor in proximity to the propeller 16) or in any known manner.

In accordance with the illustrated embodiment, the trim angle of the watercraft in also sensed by means of a trim condition sensor 29 that is carried by the swivel bracket 17 and which outputs a trim angle signal $\phi$ to the interface 31 for conversion into an appropriate signal for transmission to the CPU 25. In the illustrated embodiment trim angle and watercraft velocity are the only two watercraft conditions which are sensed and processed by the CPU 25. As aforenoted, however, a wide variety of other conditions may be sensed and processed by the CPU 25.

The gear reduction unit 24 also includes an angle position sensor for sensing the angular position of the trim tab 21. This sensor outputs a signal $\theta$ to the interface 31 for conversion into an appropriate signal for processing by the CPU 25.

The CPU 25 and its RAM 27 and ROM 26 are preprogrammed, in manner to be described, so as to compare the sensed speed N and trim angle condition $\phi$ and to generate an output signal indicative of the desired trim tab position for these sensed conditions. The CPU 25 also receives the signal indicating the trim tab position $\theta$ and makes an internal comparison to determine if the trim tab angle that is existent is the desired angle or not. This processing may be best understood by reference to FIG. 2, which is a block diagram showing the logic of the CPU 25.

Figure 2:
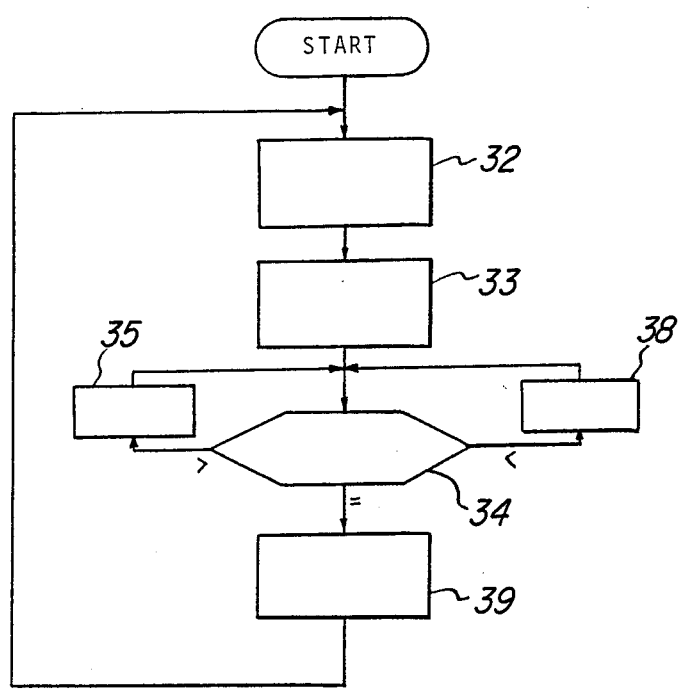
FIG. 2 is a block diagram showing the logic of the CPU in setting the trim tab device in accordance with an embodiment of the invention.

In FIG. 2, at the initialization or starting step, which is initiated when the main switch (not shown) is switched on, the CPU 25 performs an initialization step and then reads the input signals of engine speed, trim angle and trim tab angle (N, $\phi$ and $\theta$) sequentially through the interface 31 at the step 32. These signals are then stored temporarily in the RAM 27 at this same step 32.

From this input signals of speed, trim angle position and trim tab angle position (N, $\phi$ and $\theta$), the CPU outputs a signal $\text{\textcircled{H}}$ at the block 33 which comes from a map which as been memorized in the ROM 26. Alternatively, if the optimum trim tab angle $\text{\textcircled{H}}$ is memorized in the ROM 26 as an operational expression, the CPU determines the appropriate output signal $\text{\textcircled{H}}$ from the noted values of N and $\phi$.

After the output signal $\text{\textcircled{H}}$ is generated, the CPU compares that signal with the actual trim tab angle position $\theta$ at the step 34. If clockwise adjustment is necessary, the system moves to the block 35 so as to activate the motor 23 in the appropriate direction through an output interface 36 (FIG. 1) and driver 37 so as to achieve rotation in this direction. On the other hand, if counterclockwise rotation is determined, the system moves to the block 38 and achieves this rotation. The rotation continues cyclically until the comparison indicates that the actual trim tab angle $\theta$ is equal to the desired trim tab angle $\text{\textcircled{H}}$ and then the program is stopped at the step 39.

The preset or optimum trim tab position $\text{\textcircled{H}}$ for the various sensed watercraft running conditions can be preset at the factory. That is, the factory can preset the CPU 25 based upon the anticipated values required by the watercraft with which the outboard drive 11 will be employed. Alternatively, the system may be such that the operator may himself determine by trial and error the desired trim tab position to maintain course setting for each running condition and preprogram the computer in response to this trial and error setting. The means by which this may be done is believed to be well within the scope of those skiled in this art.

It should be readily apparent, therefore, that the illustrated device is extremely effective in setting the desired trim tab angle for any of the sensed running conditions of the watercraft. In this way, the watercraft will be maintained on course without the necessity of the operator making continuous corrections.

Although an embodiment of the invention has been illustrated and described, various changes and modifications may be made without departing from the spirit and scope of the invention, as defined by the appended claims.

We claim:

1. In a marine outboard drive comprising propulsion means, said propulsion means being effective to generate a force tending to cause an associated watercraft to deviate from a preset course, and trim tab means journaled upon said outboard drive and pivotal to positions for generating a hydrodynamic force upon movement of the watercraft for resisting course deviations caused by the force generated by said propulsion means, the improvement comprising means for measuring a watercraft running condition tending to effect said course deviations, memory means for storing information as to the desired positions of said trim tab means for the measured watercraft running condition, and means for steering said trim tab means in the desired position for the measured running condition.

2. In a marine outboard drive as set forth in claim 1 wherein the running condition is a condition of the watercraft.

3. In a marine outboard drive as set forth in claim 2 wherein the watercraft condition is hull speed.

4. In a marine outboard drive as set forth in claim 2 wherein the watercraft condition is hull trim angle.

5. In a marine outboard drive as set forth in claim 2 wherein the watercraft condition is the steered angle.

6. In a marine outboard drive as set forth in claim 1 wherein the measured running condition is a condition of the propulsion means.

7. In a marine outboard drive as set forth in claim 6 wherein the propulsion means condition is engine speed.

8. In a marine outboard drive as set forth in claim 6 wherein the propulsion means condition is propulsion means speed.

9. In a marine outboard drive as set forth in claim 6 wherein the propulsion means comprises an outboard drive having a propeller and supported for steering movement about a steering axis.

10. In a marine outboard drive as set forth in claim 9 wherein the propulsion means condition is the steered angle of the outboard drive.

11. In a marine outboard drive as set forth in claim 9 wherein the propulsion means condition is propeller speed.

12. In a marine outboard drive as set forth in claim 1 wherein there are a plurality of running conditions measured and memorized.

13. In a marine outboard drive as set forth in claim 1 wherein there is provided a comparator circuit for comparing the measured position of the trim tab means with the optimum position of said trim tab means.

14. In a marine outboard drive as set forth in claim 1 wherein the memory means stores preset information.

15. In a marine outboard drive as set forth in claim 14 wherein an operator of the outboard drive presets the information.

* * * * *